United States Patent [19]
Lam

[11] Patent Number: 5,810,308
[45] Date of Patent: Sep. 22, 1998

[54] LID HOLDER

[76] Inventor: Hung Lam, Room 2208, Sui Lung House, Siu Sai Wan Estate, Chai Wan, Hong Kong

[21] Appl. No.: 796,421

[22] Filed: Feb. 6, 1997

[51] Int. Cl.$^6$ .......................................................... A47H 1/16
[52] U.S. Cl. ......................................... 248/302; 211/41.11
[58] Field of Search ................................. 248/302, 309.1; D6/566; 211/41.11

[56] References Cited

U.S. PATENT DOCUMENTS

| | | | |
|---|---|---|---|
| D. 362,778 | 10/1995 | Mele | D6/566 |
| D. 369,052 | 4/1996 | Mele | D6/566 |
| 4,850,556 | 7/1989 | Otani et al. | 248/309.1 X |
| 5,170,978 | 12/1992 | Hoffman | 248/309.1 |
| 5,246,195 | 9/1993 | Huff | 248/309.1 |
| 5,297,766 | 3/1994 | Hoffman | 248/309.1 |

*Primary Examiner*—Ramon O. Ramirez
*Attorney, Agent, or Firm*—Beveridge, DeGrandi, Weilacher & Young, LLP

[57] ABSTRACT

A lid holder for holding a cookware lid having handling means in an inclined position on a horizonal surface. The holder comprises a body having a portion which is shaped, in the form of an upwardly facing recess and/or an upward protrusion, to engage the handling means of the lid with the lid leaning against the body. A separate support may be provided for supporting the body of the lid holder on a wall.

18 Claims, 2 Drawing Sheets

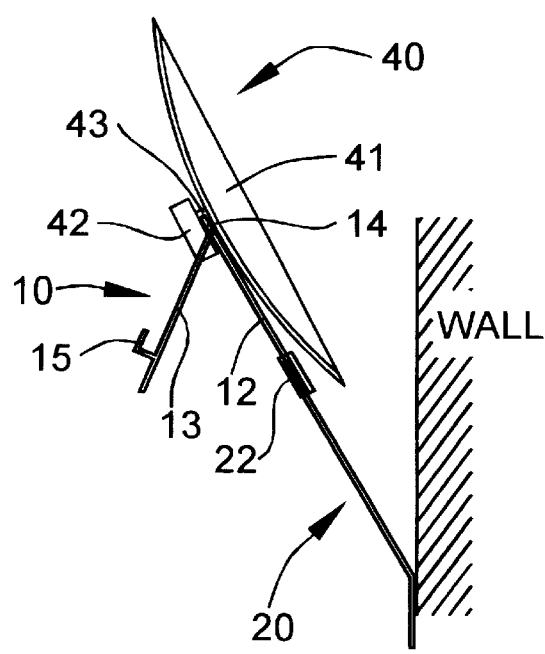
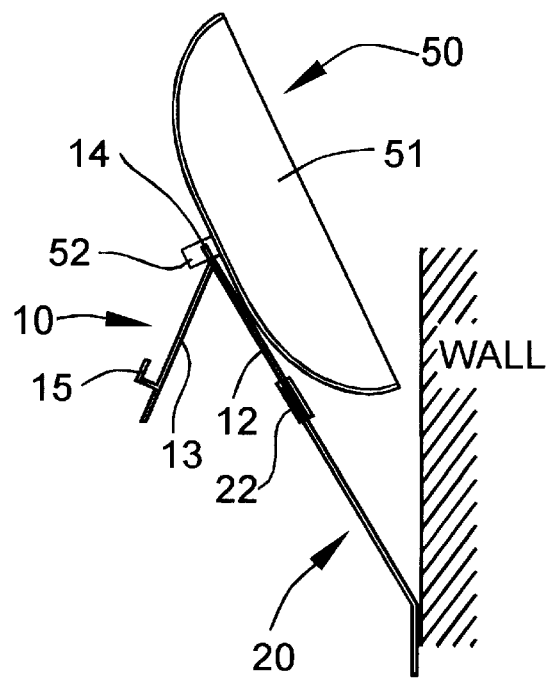
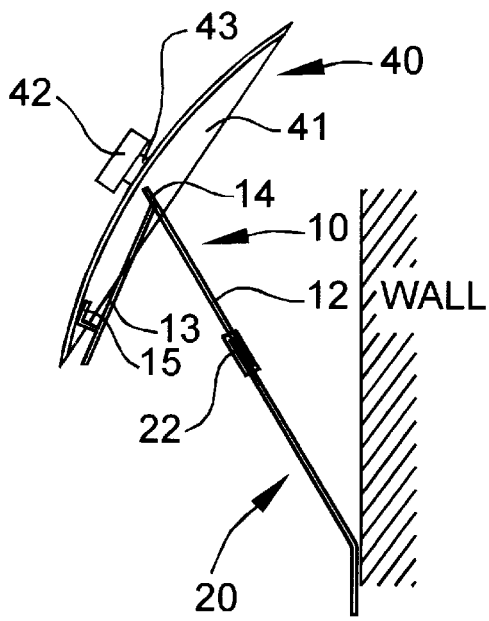
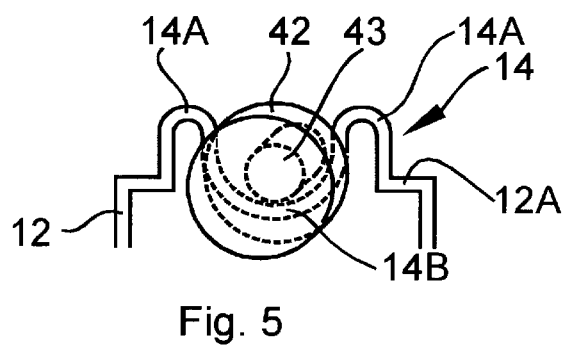
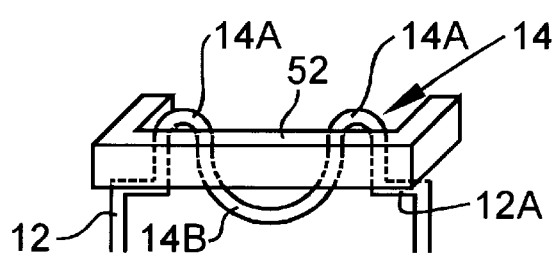
Fig. 4
Fig. 6
Fig. 5
Fig. 8
Fig. 7

LID HOLDER

The present invention relates to a lid holder for holding a lid of a cookware such as wok, pot or saucepan.

During cooking or dining, the lid of a cookware is hot and frequently needs to be removed and replaced. People usually put a removed lid flat on a table, either facing up or down, which takes up much room on the table. With the lid facing downwards, liquid, such as soup or sauce, will stain the table and steam will condense on the table. With the lid placed up-side-down, it may rock on the table and is not convenient for people to pick up again particularly when it is hot.

SUMMARY OF THE INVENTION

According to the invention, there is provided a lid holder for holding a cookware lid having handling means in an inclined position on a horizonal surface, which holder comprises a body having a portion which is shaped to engage the handling means of the lid with the lid leaning against the body.

It is preferred that the body is in the form of a frame.

In a preferred construction, the body is collapsible for storage.

More preferably, the body is formed by two inter-connected members which are movable close together for storage.

Further more preferably, the body members are hinged together for folding open and closed.

In a first preferred embodiment, the body portion is in the form of an upwardly facing recess for engaging partially around the handling means of the lid.

In a second preferred embodiment, the body portion is in the form of an upward protrusion for being engaged around by the handling means of the lid.

It is preferred that the body portion is in the form of an upwardly facing recess and an upward protrusion provided in a side-by-side manner.

More preferably, the body portion is in the form of one said recess and two said protrusions which are provided on opposite sides of the recess.

Advantageously, the body has two lower hooks for engaging a rim of the lid with the lid leaning against the body.

In a preferred embodiment, the lid holder includes a separate support which is adapted to be located on a wall or structure and comprises a releasable connector for connecting and thus supporting the body of the lid holder.

More preferably, the support is in the form of a frame.

It is preferred that the connector and the body of the lid holder are adapted to be connected together by engaging one, at least partially, into the other.

More preferably, the connector is in the form of a pair of opposed channels adapted to receive and thus engage a part of the body of the lid holder.

BRIEF DESCRIPTION OF DRAWINGS

The invention will now be more particularly described, by way of example only, with reference to the accompanying drawings, in which:

FIG. 4 is a side view corresponding to FIG. 2, showing the lid holder holding a lid having a knob;

FIG. 5 is an enlarged front view of a part of the lid holder engaging the knob of FIG. 4;

FIG. 6 is a side view corresponding to FIG. 2, showing the lid holder holding a lid having a bracket;

FIG. 7 is an enlarged front view of a part of the lid holder engaging the bracket of FIG. 6; and FIG. 8 is a side view corresponding to FIG. 4, showing the lid holder holding the lid in a different manner.

DETAILED DESCRIPTION OF PREFERRED EMBODIMENTS

Figure 1:
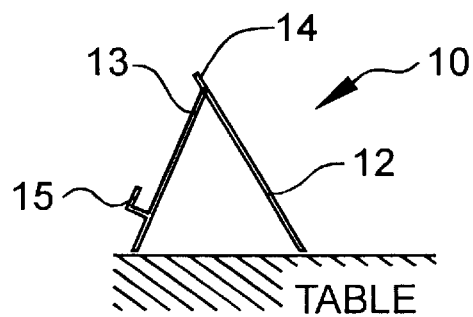
FIG. 1 is a side view of an embodiment of a lid holder in accordance with the invention, for use on a table.
Figure 2:
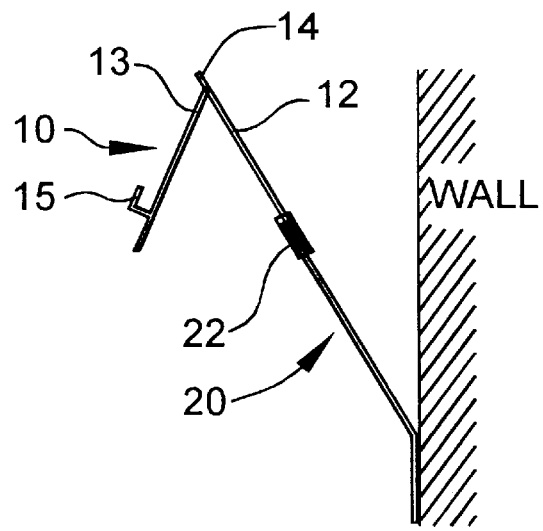
FIG. 2 is a side view of the lid holder of FIG. 1, in combination with a wall mount, for use on a wall.
Figure 3:
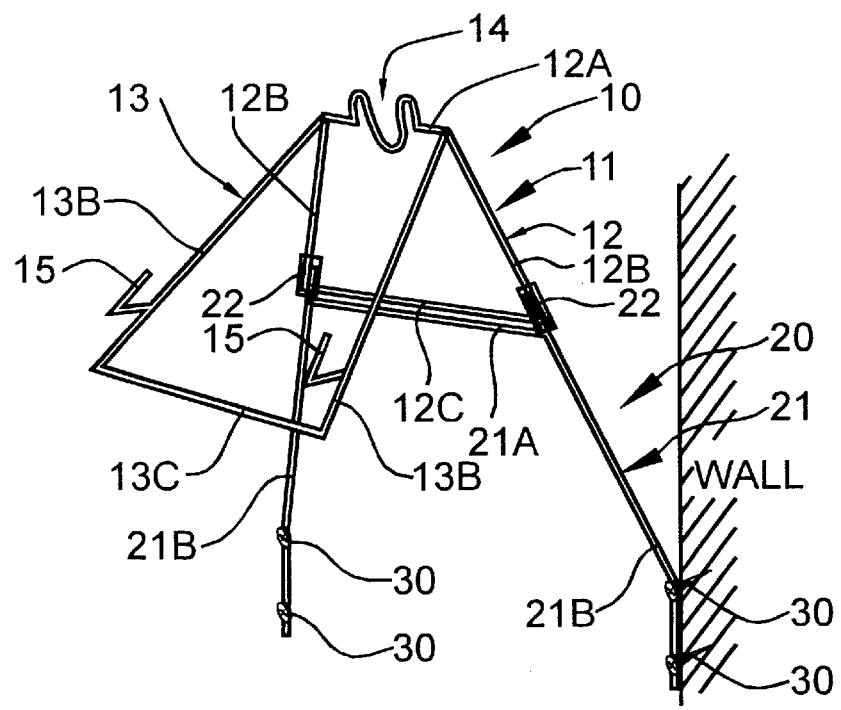
FIG. 3 is a perspective view of the lid holder and wall mount of FIG. 2.

Referring firstly to FIGS. 1 to 3 of the drawings, there is shown a lid holder 10 embodying the invention for holding a cookware lid in an inclined position, which lid holder 10 has a body 11 formed by a pair of inter-connected planar members 12 and 13. The first body member 12 is either formed by a metal wire bent or made of plastic moulded into a generally trapezoidal frame having a relatively shorter horizontal top limb 12A which has a central portion 14 in the general shape of a letter "M". The M-shaped portion 14 has a pair of bent-up protrusions 14A and a bent-down depression or recess 14B between the protrusions 14A. The body member 12 includes two upright side limbs 12B and a relatively longer horizontal bottom limb 12C.

The second body member 13 is either formed by a metal wire bent or made of plastic moulded into a trapezoidal frame without a relatively shorter horizontal top limb. The body member 13 has two upright side limbs 13B and a relatively longer horizontal bottom limb 13C. The side limbs 13B are provided with respective lower hooks 15 facing outwards.

The uppermost ends of the side limbs 13B of the second body member 13 are hingedly connected to respective opposite upper corners of the first body member 12, such that the two body members 12 and 13 are foldable close together for storage in a space-saving manner. The hinge connection is lockable fixed, for example through a snapping action or friction or by means of a strut or chain, to have the two body members 12 and 13 extending apart (open) at an acute angle of, say, 60° downwards for use standing symmetrically on a horizontal surface such as a table.

In this particular embodiment, the lid holder 10 includes a separate wall mount 20 for use on a wall or structure such as a utility rack. The wall mount 20 has a body 21 which is either formed by a metal wire bent or made of plastic moulded into a trapezoidal frame without a relatively longer horizontal bottom limb. The body 21 has a relatively shorter top limb 21A and two upright side limbs 21B and includes a pair of opposed channel-shaped connectors 22. The connectors 22 are provided at respective opposite upper corners of the body 21, extending longitudinally upwards from the respective side limbs 21B beyond the top limb 21A, for connecting the lid holder body 11. The lowermost ends of the side limbs 21B are bent and fixed to the wall by respective pairs of screws 30, with the result that the body 21 is inclined at an acute angle of about 30° upwards and away from the wall.

For use on the wall, the lid holder 10 is supported in the same previous stand-alone position by the wall mount 20, with the lowermost ends of the side limbs 12B of the holder body member 12 received by or engaged into/with the respective connectors 22 of the mount body 21. The side limbs 12B and 21B on each side are joined together by the respective connector 22 in an end-to-end manner. Thus, the lid holder 10 is located on and spaced away from the wall by the wall mount 20.

Reference is now made to FIGS. 4 and 5 of the drawings, showing a saucepan lid 40 having a body 41 and a handle in the form of a knob 42 having a neck 43. The lid holder 10 is to hold the lid 40 by the knob 42, with the neck 43 being engaged partially around and hence retained by the recess 14B of the holder M-shaped portion 14. The lid 40 is thus held in an inverted position inclined at about 60° upwards, leaning against the holder body member 12, whether the holder 10 is used on a wall (as shown) or a table.

Reference is then made to FIGS. 6 and 7 of the drawings, showing a wok lid 50 having a body 51 and an inverted-U-shaped handle 52. The lid holder 10 is to hold the lid 50 by the handle 52, with the handle 52 engaging around and hence retained by both protrusions 14A (or either one) of the holder M-shaped portion 14. The lid 50 is thus held in an inverted position inclined at about 60° upwards, leaning against the body member 12, whether the holder 10 is used on a wall (as shown) or a table.

Referring finally to FIG. 8 of the drawings, the saucepan lid 40 may alternatively be held in a normal facing-down position inclined at about 60° upwards, leaning against the other side of the holder 10, by having the rim of the lid 40 being engaged and hence retained by the hooks 15.

The lid 40 or 50 held by the lid holder 10 in position, as described above, is spaced away from the table or wall and hence will not stain it with soup or sauce and/or condense water on it. Also, the lid 40 or 50 can conveniently be picked up again by the knob 42 or handle 52 which is easily accessible.

The invention has been given by way of example only, and various modifications of and/or alterations to the described embodiments may be made by persons skilled in the art without departing from the scope of the invention as specified in the appended claims.

What is claimed is:

1. A lid holder, comprising:
   a body having a first body member, a second body member and a holding portion shaped to engage a handle of a lid with the lid leaning against the body,
   wherein the body members are disposed in two different plate surfaces, define a vertex at an intersection thereof and formed a self supporting base at end opposite to said vertex for supporting said holder on a horizontal surface, and
   the holding portion is disposed at the vertex.

2. A lid holder as claimed in claim 1, wherein the body is in the form of a frame.

3. A lid holder as claimed in claim 2, wherein the body is collapsible for storage.

4. A lid holder as claimed in claim 3, wherein the body members are inter-connected and movable close together for storage.

5. A lid holder as claimed in claim 4, wherein the body members are hinged together for folding open and closed.

6. A lid holder as claimed in claim 1, wherein the body is collapsible for storage.

7. A lid holder as claimed in claim 6, wherein the body members are inter-connected and movable close together for storage.

8. A lid holder as claimed in claim 7, wherein the body members are hinged together for folding open and closed.

9. A lid holder as claimed in claim 1, wherein the holding portion is in the form of an upwardly facing recess for engaging the handle of the lid.

10. A lid holder as claimed in claim 1, wherein the body members are arranged to further define a base opposite the vertex, the base being for supporting the lid holder on a horizontal surface.

11. A lid holder, comprising:
    a body having a holding portion shaped to engage a handle of a lid with the lid leaning against the body, and
    a separate support adapted to be located on a wall or structure, the separate support including a releasable connector for connecting and supporting the body of the lid holder.

12. A lid holder as claimed in claim 11, wherein the support is in the form of a frame.

13. A lid holder as claimed in claim 11, wherein the connector and the body of the lid holder are adapted to be connected together by engaging one, at least partially, into the other.

14. A lid holder as claimed in claim 13, wherein the connector is in the form of a pair of opposed channels adapted to receive and engage a part of the body of the lid holder.

15. A lid holder, comprising:
    a body having a holding portion shaped to engage a handle of a lid with the lid leaning against the body,
    wherein the holding portion includes an upward protrusion for engaging the handle of the lid.

16. A lid holder as claimed in claim 15, wherein the upward protrusion of the holding portion defines an upwardly facing recess.

17. A lid holder as claimed in claim 15, wherein the upward protrusion of the holding portion includes one recess defined by two protrusions provided on opposite sides of the recess.

18. A lid holder, comprising:
    a body having a holding portion shaped to engage a handle of a lid with the lid leaning against the body,
    wherein the body has two lower hooks for engaging a rim of the lid with the lid leaning against the body.

* * * * *